United States Patent [19]
Cunningham et al.

[11] Patent Number: 6,029,139
[45] Date of Patent: Feb. 22, 2000

[54] METHOD AND APPARATUS FOR OPTIMIZING PROMOTIONAL SALE OF PRODUCTS BASED UPON HISTORICAL DATA

[75] Inventors: Scott W. Cunningham, Atlanta, Ga.; Randy G. Kerber, San Jose, Calif.

[73] Assignee: NCR Corporation, Dayton, Ohio

[21] Appl. No.: 09/014,475

[22] Filed: Jan. 28, 1998

[51] Int. Cl.$^7$ .................................................. G06F 17/60
[52] U.S. Cl. ................................................. 705/10; 705/14
[58] Field of Search ............................... 705/10, 14, 925

[56] References Cited

U.S. PATENT DOCUMENTS

| 5,504,675 | 4/1996 | Cragun et al. | 705/14 |
| 5,526,257 | 6/1996 | Lerner | 705/10 |
| 5,774,868 | 6/1998 | Cragun et al. | 705/10 |
| 5,874,955 | 2/1999 | Rogowitz et al. | 345/339 |

OTHER PUBLICATIONS

Tom Schwartz; "Applications on Parade"; Electronic Design; v.43, n.16 p. 68, Aug. 7, 1995.

Mary Ruggerio; "Infromation Refining with Neural Nets"; DBMS; v.4, n.7, p. 62(2), Jun. 1991.

News Release; "Neural Network Software Integrated with Spreadsheet Uses Powerful New Learning Method"; Dateline: Milwaukee, WI, Nov. 9, 1992.

*Primary Examiner*—James P. Trammell
*Assistant Examiner*—Demetra R. Smith
*Attorney, Agent, or Firm*—Needle & Rosenberg; Peter H. Priest

[57] ABSTRACT

A system for optimizing the promotional sale of a product, a product segment, or a category which may take into account related products or competing products comprising means for generating a three-dimensional data structure corresponding to the sales history for a product, the data structure dimensions corresponding to an event type domain, a time domain, and a unit of measurement domain, means for populating the three-dimensional data structure, a neural network, means for training the neural network and means for applying sales objectives and constraints to the neural network.

12 Claims, 4 Drawing Sheets

METHOD AND APPARATUS FOR OPTIMIZING PROMOTIONAL SALE OF PRODUCTS BASED UPON HISTORICAL DATA

BACKGROUND OF THE INVENTION

1. Field of the Invention

The present invention generally relates to a system and method for evaluating and optimizing promotional sale of products based on historical data.

2. Description of the Prior Art

Evaluators and optimizers are two types of systems for studying promotional plans for products. Evaluators evaluate a promotional plan to reveal whether the implementation of that plan would cause the sales desired by the user. Optimizers use evaluators to develop new promotion plans or to suggest changes to existing promotion plans.

Presently, there exist systems and models to evaluate and/or optimize promotions for products. These systems include the Promotion Simulator available by A. C. Nielsen, the model developed by A. L. Montgomery at the Wharton School of Business in the paper *Creating Micro-Marketing Pricing Strategies Using Supermarket Scanner Data* (1995), and the model developed by D. F. Midgley, R. E. Marks, and L. G. Cooper at the Santa Fe Institute in the paper *Breeding Competitive Strategies*.

The Promotion Simulator is only an evaluator of promotion plans implemented using linear regression. This system takes one product and one promotion and evaluates the promotion. For example, for the product 'X' brand shampoo and 'Y' promotion, this system would answer the question "would promotion 'Y' increase profits of 'X' brand shampoo by x %".

The model developed at the Wharton School of Business is not a physically implemented system but only an algorithm. This algorithm employs logarithmic regression to implement an evaluator and an optimizer, and determines what promotion for product "Y" would increase profits by x %. However, the data evaluated and optimized by this system only includes price in estimating the effects of competition.

The model developed at the Santa Fe Institute is a theoretical algorithm for an optimizer. This algorithm takes as input a pay-off function describing the expected benefits for a promotion. This function may be determined empirically, or may be set experimentally. The algorithm, a genetic algorithm, then creates an optimal promotion plan in the face of competition which meets budget constraints.

While the prior art techniques described above are useful to a limited degree, none combine both an evaluator and an optimizer in a physical system to develop new promotional plans or to analyze existing plans for various products using sophisticated historical data of related products and competitors.

SUMMARY OF THE INVENTION

The present invention is a system and method of evaluating and optimizing promotional plans for products, segments of products or categories of products. Using product information and product history, the invention proposes a promotional plan that better meets a user's goals.

The invention may be designed for a three-tier client/server architecture. The architecture consists of a personal computer, client, middleware, a server, and a data warehouse. The personal computer contains software for interfacing with the user, setting goals and constraints, and eliciting promotional cost information. The middleware facilitates communication between the personal computer, the server, and the data warehouse. The server contains an evaluation component and segmentation rules. The server queries data from the data warehouse. The data is transformed as necessary, evaluated and optimized.

DETAILED DESCRIPTION OF THE INVENTION

1. Overview of the Present Invention

The promotion optimization system of the present invention determines both the costs and the benefits of a proposed promotion plan for the sale of products. Using both costs and benefits, it proposes a promotional plan that will better meet the user's goals. This may involve new promotion plans or existing promotions scheduled at different times. Another option may be the coordination of promotions between two related segments of products.

Figure 1:
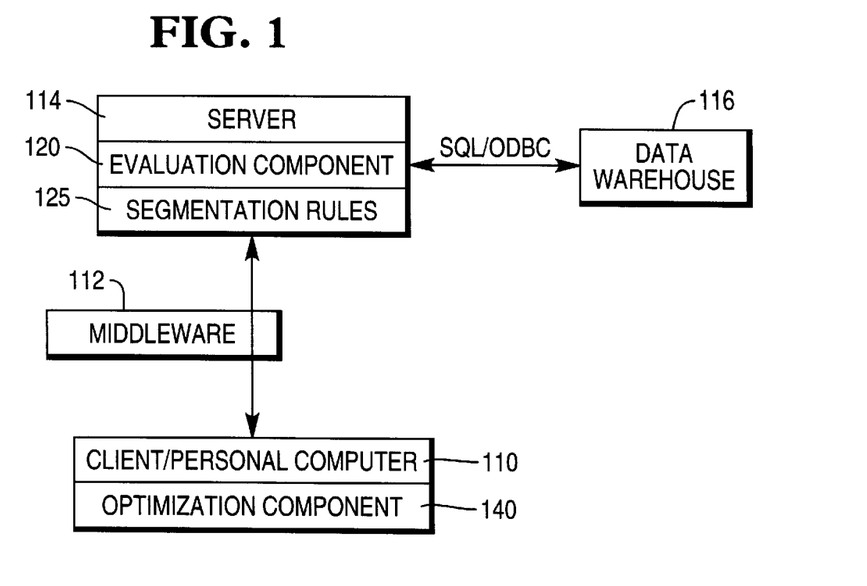
FIG. 1 is a diagram showing the overall setup for the invention.

As shown in FIG. 1, in the preferred embodiment the system is designed for a three-tier client/server architecture. The architecture consists of a personal computer 110 client, middleware 112, a server 114, and a data warehouse 116. The personal computer client 110 contains software for interfacing with the user, setting goals and constraints, and eliciting promotional cost information. The middleware 112 facilitates communication between personal computer 110, server 114 and data warehouse 116. Examples of middleware 112 include SQL, INFORMATION ADVANTAGE available from Information Advantage, or the NETSCAPE NAVIGATOR browser available from Netscape Communications Corporation.

The server 114 contains an evaluation component 120 and segmentation rules 125 for segmenting transaction data as described below. The server 114 queries data from the data warehouse 116 using SQL commands via an ODBC interface. The data warehouse 116 may contain, for example, transaction data, statistical data, and cost data. Transaction data and statistical data may be in the format of a Nielsen database. There are two formats of data available from Nielsen. In the customary format, the data is gathered by visiting a few demographically representative stores from each retailer in a given market. In the census format, the data is gathered by sampling every store in a given retailer outlet and market. The data in the census format is more accurate than the data in the customary format; however, the present invention works with either data in customary or census format.

Nielsen offers data courses and manuals that describe the contents of their databases. One reference is the *Nielsen Promotion Simulator*, User's Guide, Version 1.0, A. C. Nielsen (1993).

Table 1 below is a sample of a Nielsen database. The indices to this database are the account, product, and time identifiers (in bold). The data is transaction data that describes the sales of a given product (identified by UPC) in a particular retail outlet, for a particular region, on a given week.

TABLE 1

Nielsen Database

| Record Name | Value |
|---|---|
| 1. Account Id. | GIATL.CM |
| 2. Product Id. | BG004100000271 |
| 3. Time Id (MONDDYY-1 format) | APR0696-1 |
| 4. Sales Units | 4769 |
| 5. Sales Units Equ - Pound Basis | 1145 |
| 6. Sales Dollars | 12669 |
| 7. % ACV (% Stores Selling) | 92 |
| 8. Any Feature % ACV/Str | 0 |
| 9. Any MAD % ACV/STR(A/B AD) | 0 |
| 10. Any LAD % ACV/STR(C AD) | 0 |
| 11. Any CAD % ACV/STR(CPN AD) | 0 |
| 12. Any Display % ACV/STR | 0 |
| 13. Any A AD % ACV/STR | 0 |
| 14. Any B AD % ACV/STR | 0 |
| 15. ACV Selling $(000)/STR | 171893 |
| 16. Market ACV $(000)/STR | 186844 |
| 17. $ales Per Mill/STR(UNITS) | 28 |
| 18. Sales Per Mill/STR(EQU) - Pound Basis | 7 |
| 19. Sales Per Mill/STR($) | 74 |
| 20. Total Baseline-Units | 4502 |
| 21. Total Baseline-BFQU - Pound Basis | 1080 |
| 22. Total Baseline-Dollars | 12055 |
| 23. No Promo Units | 4769 |
| 24. No Promo Equ - Pound Basis | 1145 |
| 25. No Promo $ | 12669 |
| 26. No Promo ACV$/STR | 171893 |
| 27. No Promo % ACV/STR | 92 |
| 28. No Promo BU | 4502 |
| 29. No Promo BEQU - Pound Basis | 1080 |
| 30. No Promo B$ | 12055 |
| 31. Any Promo Units | 0 |
| 32. Any Promo EQU - Pound Basis | 0 |
| 33. Any Promo $ | 0 |
| 34. Any Promo ACV$/STR | 0 |
| 35. Any Promo % ACV/STR | 0 |
| 36. Any Promo BU | 0 |
| 37. Any Promo BEQU - Pound Basis | 0 |
| 38. Any Promo B$ | 0 |
| 39. Any Feat W/O Disp Units | 0 |
| 40. Any Feat W/O Disp EQU - Pound Basis | 0 |
| 41. Any Feat W/O Disp $ | 0 |
| 42. Any Feat W/O Dis % ACV/STR | 0 |
| 43. Any Feat W/O Disp BU | 0 |
| 44. Any Feat W/O Disp BEQU - Pound Basis | 0 |
| 45. Any Feat W/O Disp B$ | 0 |
| 46. Any Disp W/O Feat Units | 0 |
| 47. Any Disp W/O Feat EQU - Pound Basis | 0 |
| 48. Any Disp W/O Feat $ | 0 |
| 49. Any Dis W/O Fea %ACV/STR | 0 |
| 50. Any Disp W/O Feat BU | 0 |
| 51. Any Disp W/O Feat BEQU - Pound Basis | 0 |
| 52. Any Disp W/O Feat B$ | 0 |
| 53. Any Feat and Disp Units | 0 |
| 54. Any Feat and Disp EQU - Pound Basis | 0 |
| 55. Any Feat and Disp $ | 0 |
| 56. Any Fea and Dis % ACVISTR | 0 |
| 57. Any Feat and Disp BU | 0 |
| 58. Any Feat and Disp BEQU - Pound Basis | 0 |
| 59. Any Feat and Disp B$ | 0 |
| 60. Price Decr Units | 0 |
| 61. Price Decr EQU - Pound Basis | 0 |
| 62. Price Decr $ | 0 |
| 63. Price Decr % ACV/STR | 0 |
| 64. Price Decr BU | 0 |
| 65. Price Decr BEQU - Pound Basis | 0 |
| 66. Price Decr B$ | 0 |
| 67. MAD % ACV | 0 |
| 68. All Other CAD % ACV | 0 |
| 69. Display % ACV | 0 |
| 70. MAD and Disp % ACV | 0 |
| 71. CAD and Disp % ACV | 0 |

TABLE 1-continued

Nielsen Database

| Record Name | Value |
|---|---|
| 72. MAD $ | 0 |
| 73. All Other CAD $ | 0 |
| 74. Display $ | 0 |
| 75. MAD and Disp $ | 0 |
| 76. CAD and Disp $ | 0 |
| 77. MAD EQU - Pound Basis | 0 |
| 78. All Other CAD EQU - Pound Basis | 0 |
| 79. Display EQU - Pound Basis | 0 |
| 80. Incremental Dollars | 614 |
| 81. Incremental Units | 267 |
| 82. Incremental EQ Units | 65 |

Attributes data is also available from the Nielsen corporation. Table 2 below shows a representative set of attributes. The index to this table is the "Product Id" (identified by UPC number).

TABLE 2

Attributes Data

ATTRIBUTE DATA

1. Product Id
2. Additive
3. Base Description
4. Base Size
5. Brand Description
6. Case Pack
7. Category
8. Cheese Form
9. Cholesterol Content
10. Clorox Flavor
11. Container
12. CPC Flavor
13. Deal
14. Erly. Ind. Flavor
15. FatContent
16. Flavor
17. Form
18. Formula
19. Grain Size
20. Lawrys Flavor
21. Lawrys Segment
22. Lipton Flavor
23. Lipton Ramen
24. Lipton Segment
25. Manufacturer Number
26. Meat Type
27. Multi Pack
28. Pasta Base
29. Pasta Shape
30. Product
31. Quart Size
32. Style
33. Subbrand
34. Sweetener
35. Type
36. UB Pasta Side Dish
37. Unit of Measure
38. Unit Size Description
39. Univeral Product Code
40. Use
41. Variety
42. Yield The components shown in FIG. 1 interact as follows. The server 114 uses segmenting rules 125 to group or segment the transaction data according to product segment, manufacturer and region. For example, a product segment may be tea bags, a manufacturer may be Lipton and a region may be the Atlanta area. The historical data about sales and promotional activity is segmented, and then passed to the evaluation component 120. The data is transformed as necessary, and then evaluated. After the data is evaluated it is stored as a neural network 500 (in FIG. 5, described later) in the data warehouse 116. The neural network 500 shows the effectiveness of various promotional types and the consequences of competitor action. There may be multiple neural networks 500 stored in the data warehouse 116 as a segment, region or market. The neural networks can then be updated or re-evaluated at every commercial data update.

At run-time, the user specifies the product segment, time frame, account and market they wish to optimize.

Figure 2:
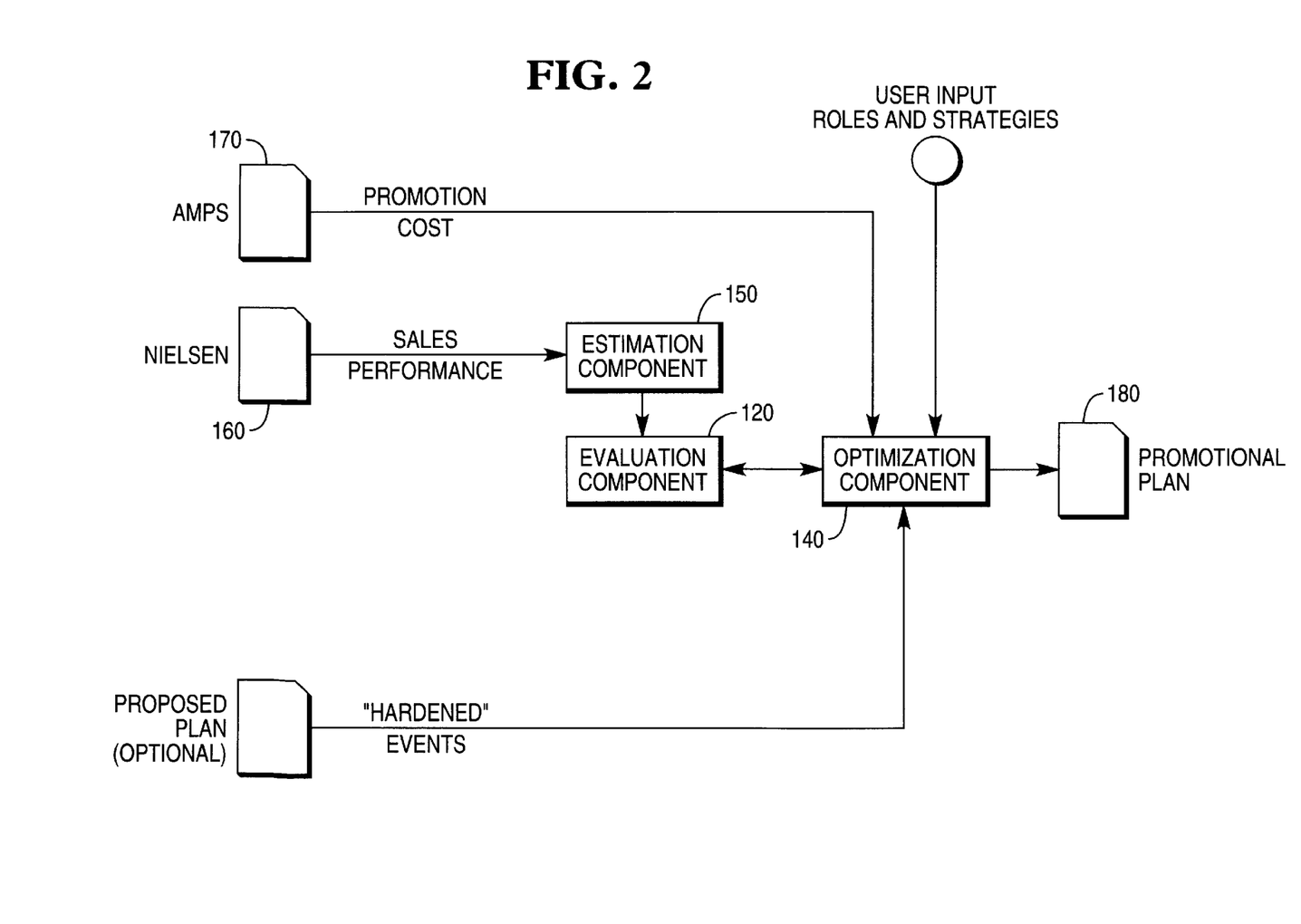
FIG. 2 is a diagram showing the interaction between the estimation component, the evaluation component and the optimization component.

As shown in FIG. 2, the optimization system consists of at least three components: an optimization component 140, an evaluation component 120, and an estimation component 150. Upon requests from the user, the estimation component 150 will update estimates of current market and account conditions as well as the effectiveness ratings of the various promotional types by obtaining data from a data warehouse 116 such as a Nielsen database. This update occurs off-line in the server 114, and results in improved estimates whenever new and relevant data is stored in the data warehouse 116.

A user will begin the optimization process by specifying information about the account, the product role in the account, and the promotional strategy. This information is entered on the personal computer client 110. For example, the user may want to create a promotional plan that maximizes the volume of a product sold for a given promotional budget.

The optimization component 140 along with the evaluation component 120 then tests a succession of improved plans. Each plan is evaluated according to the calculated cost, as received from a cost database such as a database containing AMPS data 170 and the predicted performance, as given by the evaluation component 120. A recommended promotion plan 180 is given as the output. Note that the output encompasses the cost of the promotions (from AMPS), the perceived benefits of the promotion (from Nielsen data and the evaluation component 140), as well as strategic and other intangible information input by the user. Intangible information is product management information that defines the roles and strategies for a product or category of products. For example, to create a winning product (e.g. high number of sales and a high gross margin) the implied strategy may be to increase promotional frequency, increase product demonstrations, reduce out-of-stocks, improve shelf position, and to respond quickly to new item opportunities.

The optimization component 140 may use a technique called "linear optimization". Linear optimization is a formal search strategy for selecting the best promotions at the least cost. The "best" promotions are based upon quantifiable inputs given by the user, such as volume, price, or profit goals. Alternatively, the linear optimization routine may be used to minimize cost while keeping a particular desired level of sales or volume.

2. The Optimization Component 140

Figure 5:
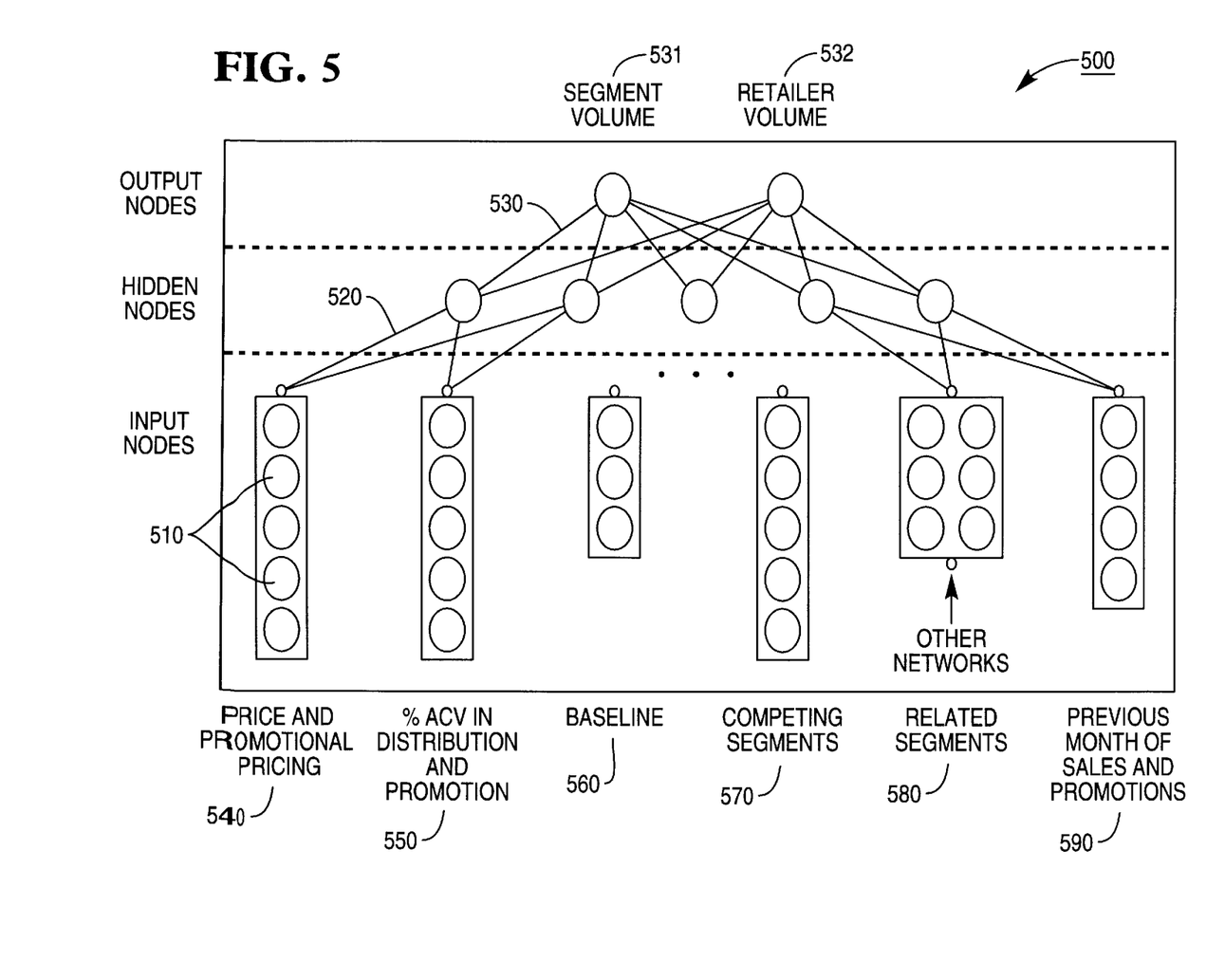
FIG. 5 is a diagram showing a neural network.

The optimization component 140 creates a data model for input into a neural network 500, as shown in FIG. 5. This component requires two kinds of data: (1) transaction data which are the sales generated by previous promotions; and (2) cost and profit formulas which are the formulas describing the costs and profits involved in staging promotions. These formulas are resident in the personal computer 110 and used by the optimization component 140. Examples of cost and profit formulas include:

Manufacturer Costs and Profits

Mfg. Cost=(Fixed Manufacturing Costs)+(Incremental Distribution Costs+Incremental Manufacturing Costs) *(Volume Sold+Forward Buy)+Promotion Costs Mfg. Profit=(Volume Sold+Forward Buy)*Wholesale Price−Mfg. Costs Mfg. Margin=(Mfg. Profit−Mfg. Cost)/(Volume Sold+Forward Buy)

Promotion Costs=Event Outlay+(Incremental Promotion Costs by Participation*%ACV Participation)+(Incremental Promotion Costs by Item*Volume Sold)

Retailer Costs and Profits

Retailer Cost=(Wholesale Price+Retailer Incremental Costs)*(Volume Sold+Forward Buy)+Retailer Fixed Costs Retail Price=Wholesale Price+Retailer Margin Retailer Profit=(Volume Sold*Retail Price)−Retailer Costs If the optimization component 140 is given transaction data about a product, segment or category, it can make plans for that product, segment, or category. For purposes of describing the optimization component, a "product" in the preferred embodiment is a single UPC, or a group of UPCs that represent changes in the product's packaging or ingredients. A "segment" is a group of products that may be promoted in the same manner. A "category" is a group of segments representing a broad class of package goods.

Figure 3:
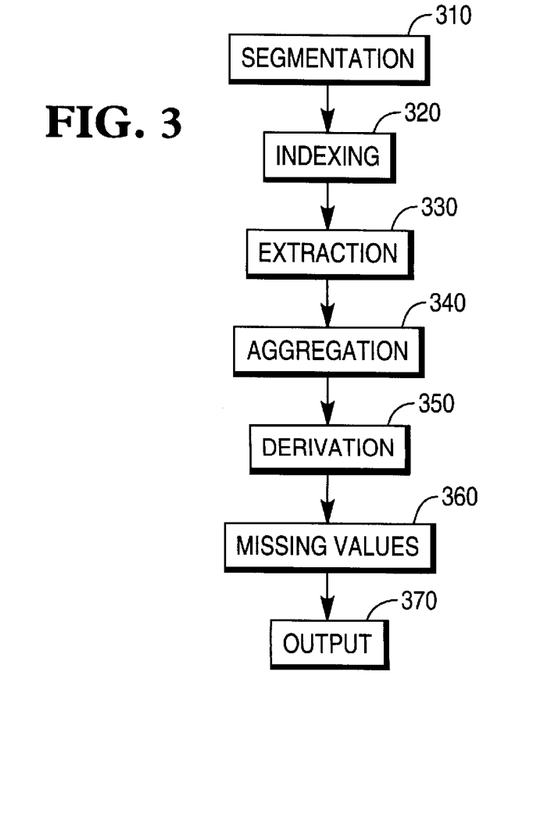
FIG. 3 is a diagram showing the process performed by the optimization component.

As shown in FIG. 3, in the preferred embodiment, there are seven steps to create a data model. The first step is segmentation 310 or the grouping of products that may be promoted together. A group of products is a segment. Segmentation is performed by the server 114. The second step is indexing 320 or the initialization of data structures for storing the transaction data. The third step is extraction 330 or obtaining data from the data warehouse 116 and storing it in a data structure. The fourth step is aggregation 340 or the process of aggregating transaction data for products to create segments. The fifth step is derivation 350 or the derivation of variables computed from the transaction data. The sixth step is missing values 360 which is a system check for variables that may be undefined. The seventh step is output 370, or the data model to be used as input to the neural network 500.

A. Segmentation (Step 310)

Transaction data may be obtained from commercially available databases such as Nielsen data. Nielsen data contains an individual record for each retailer, week, and product. The product information may be in the format of a UPC which describes diverse characteristics or attributes of the products including, for example, flavor, size, and fat content.

The first step is to take the transaction data and segment it into groups of products that may be promoted together. For example, individual segments are known as "brand families". Segments may be further grouped into higher level categories that represent a broad class of goods.

In the preferred embodiment, segmentation rules are used to segment the transaction data. These rules take into account attributes of the product to group products together into segments. An example of a segmentation rules for a category may be as follows:

| Category: Tea Bags | |
| --- | --- |
| * Attributes: | Aggregate unique combinations of "Yield", "Caffeination", "Count", and "Manufacturer". |
| * Rules: | |
| (1) | Include all products contributing 95% of the sales in this category. |
| (2) | Exclude all products whose promoted volume is less than 1% of sales. |
| (3) | Exclude all manufacturers with less than 1% of sales. |
| (4) | Include all products from manufacturers with the same attributes as those products in Rule 1. |

The attributes of the products are used to aggregate the products into distinct segments. The rules are used to select which segments are suitable for further analysis. The user, according to specific business needs, specifies the rules and attributes.

B. Indexing (Step 320)

In the preferred embodiment, there are two types of index variables:

1. segment/manufacturer domains or indices: used to distinguish transaction data across products; and
2. time domain/event domain/unit of measurement domain: used to distinguish transaction data within products.

Indices are assigned to each segment within a category. Indices are also assigned to each major manufacturer within a category. Sample segment and manufacturer indices for the tea bag category are shown below in Table 3:

TABLE 3

| Segment Indices | | | | |
| --- | --- | --- | --- | --- |
| | CAFFEINATED | | DECAF | |
| COUNT | CUP SIZE | FAMILY | CUP SIZE | FAMILY |
| 100 | Segment 3 | | | |
| 72 | | | | Segment 6 |
| 48 | Segment 2 | | | Segment 5 |
| 24 | | Segment 0 | | Segment 4 |
| 16 | Segment 1 | | | |

In Table 3, any product with the attributes of 24 count, caffeinated, family size is defined as Segment 0. Any product that is not explicitly defined in the table is put into Segment 7.

Table 4 is an example of manufacturer indices.

TABLE 4

| Manufacturer Indices | |
| --- | --- |
| Manufacturer | Index |
| Control Brand | 0 |
| 'A' Manufacturer | 1 |
| 'B' Manufacturer | 2 |
| 'C' Manufacturer | 3 |
| 'D' Manufacturer | 4 |
| 'E' Manufacturer | 5 |
| Other | 6 |

Figure 4:
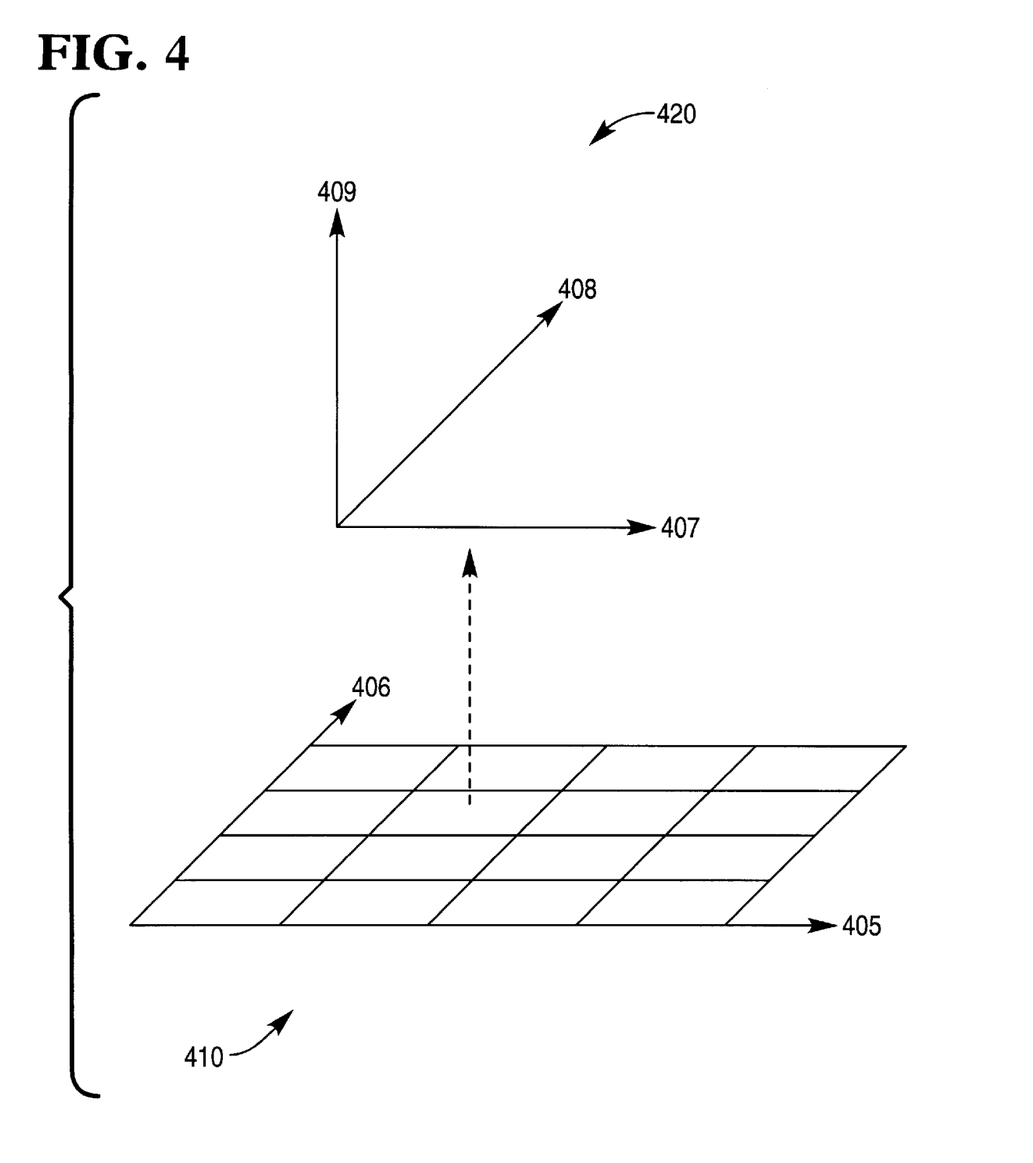
FIG. 4 is a diagram showing the data structures.

In the preferred embodiment, the segment and manufacturer indices are used to index a two-dimensional data structure 410 shown in FIG. 4. This data structure is populated with information on the event type domain, time domain and unit of measurement domain, as discussed below.

Transaction data is summarized by what time during the year the event for the product occurred. This measurement is usually by week. For example, each week of the year is given a unique identifier such as week 1 through week 52. For each week there is an event type domain. The event type domain may be one or a number of promotional events. The event type may include all events, no events, or any promotion event. A promotion event may be feature, display, feature and display, or temporary price reduction. Table 5A summarizes the event definitions and Table 5B summarizes the promotional events.

TABLE 5A

| Event Definition | |
| --- | --- |
| Event Type | Event |
| 0 | All Events |
| 1 | No Promotion |
| 6 | Any Promotion Event |

TABLE 5B

| Promotional Events | |
| --- | --- |
| Type | Promotion |
| 2 | Feature |
| 3 | Display |
| 4 | Feature and Display |
| 5 | Temporary Price Reduction |

The unit of measurement domain is the type of data to be stored that indicates the number of items sold. Depending on the unit of measurement, the value stored could represent volume, sales, or participation times volume. Table 6 shows the different values indexed by unit of measurement.

TABLE 6

| Data Type Definitions | |
| --- | --- |
| Unit of Measurement | Information Stored |
| 0 | Volume |
| 1 | Sales |
| 2 | Participation * Volume |

The event type domain, time domain and unit of measurement domain are used to create a three dimensional data structure 420 for storing event type, week, and sales information, as shown in FIG. 4.

In the preferred embodiment, the data structure 410 indexed by manufacturer and segment and the data structure 420 indexed by event type domain, time domain and unit of measurement domain are combined or linked. In essence, each cell of the manufacturer/segment data structure 410 points to the three-dimensional data structure 420.

Instead of combining the two-dimensional and three-dimensional data structures (410, 420), the data may be kept in a single five-dimensional data structure. However, separate operations are performed on each of the data structures, so grouping the data into two combined data structures makes it easier to perform operations on the transaction data grouped by any of the indices described.

C. Extraction (Step 330)

The next step involves the extraction of the transaction data and its storage in the data structures identified above.

First, the organization of the transaction data and then the placement of this data in the two-dimensional and three-dimensional data structures 410, 420 are discussed.

The following list shows the variable names in the transaction data, and their location by column. Each record shows a unique combination of UPC, account, and week.

Transaction Data Record account=entry[1];

upc=entry[2];

sql=entry[3];

totp=entry[8];

totu=entry[5];

totd=entry[7];

nopp=entry[28];

nopu=entry[24];

nopd=entry[26];

fndp=entry[43];

fndu=entry[40];

fndd=entry[42];

dnfp=entry[50];

dnfu=entry[47];

dnfd=entry[49];

fadp=entry[57];

fadu=entry[54];

fadd=entry[56];

tprp=entry[64];

tpru=entry[61];

tprd=entry[63];

prop=entry[36];

prou=entry[32];

prod=entry[34];

The account code, located in the first field may be used to filter the data since the user specifies one account/market combination. The upc entry, located in the second field, is the UPC for the product and it is used with the segmentation rules to identify segmentation and manufacturer for the product. The UPC is therefore sufficient to identify which cell in the two-dimensional data structure 410 any given record is to be placed. Each subsequent data entry in the record must be parsed and placed in the appropriate location within the data structures 410, 420.

The data which follows is named using the following nomenclature, where the 'x' represents a "wild-card". The name of each variable consists of an identifier for the event name domain and the unit of measurement domain.

TABLE 7

Fields for Event Names

| Event Domain | Variable Names | Name of Event |
|---|---|---|
| 0 | totx | All Events |
| 1 | nopx | No Promotion |
| 2 | fndx | Feature No Display |
| 3 | dnfx | Display No Feature |
| 4 | fadx | Feature and Display |
| 5 | tprx | Temporary Price Reduction |
| 6 | prox | Any Promotion Event |

TABLE 8

Fields for Domain Names

| Unit of Measurement Domain | Variable Name | Information Stored |
|---|---|---|
| 0 | Xxxp | % Participation in Promotion |
| 1 | xxxu | Volume |
| 2 | xxxd | Sales in Dollars |

The sql field is the time domain, which may be the week index into the three-dimensional structure 420. Therefore, using the information in the sql variable and Table 5 and Table 6, each variable in the record may be stored in its appropriate location in the three-dimensional data structure 420.

C. Aggregation (Step 340)

As different products are placed into the cells of the three-dimensional structure 420, the variables are aggregated.

From the two-dimensional data structure 410 indexed by manufacturer and segment, related variables may be computed. Competing variables are those that directly compete with the target cell. If the target cell is defined as belonging to Segment 6, the competitor variables would be all other manufacturers in Segment 6. The related variables would be all segments of the same manufacturer. Hence depending on the position of the target cell, the competing and related variables can be defined.

TABLE 9

Target, Related and Competitor Variables

| Segment | Segment 0 | Segment 1 | . . . | Segment 6 | Segment 7 |
|---|---|---|---|---|---|
| Mfg. A |  |  |  | Competitor |  |
| Mfg. B | Related | Related | Related | Target | Related |
| Mfg. C |  |  |  | Competitor |  |
| Mfg. D |  |  |  | Competitor |  |
| Mfg. E |  |  |  | Competitor |  |

As noted above, data is aggregated into the three-dimensional structure, while certain variables such as related products and competitors might be derived as shown in Table 9. In the preferred embodiment this is performed by first referring to the two-dimensional data structure 420 indexed by manufacturer and segment and then refer to the three-dimensional data structure 430 to arrive at the desired variable.

D. Derivation (Step 350)

Variables may be derived from the extracted data. Neural networks, such as neural network 500 in FIG. 5, best operate on the logarithmic form of data and hence logarithmic transformations are performed on most variables. The variables to derive include:

Competitor variables: Total sales (i.e. by week) of other manufacturers.

Related variables: Sales (i.e. by week) of other segments in the same category.

Variables that provide event and price information: Number of stores participating.

Baseline Variables: Number of items sold in isolation of promotion.

Historical information regarding sales and events: How much of product was sold in the past.

Output variables: How much of product sold for the segment and category.

A two step process may be used to derive competitor variables. In the first step, the target cell of the two-dimensional data structure 410 is identified. The three dimensional data structure 420 is then accessed to obtain time domain, event domain and unit of measurement domain. For competitors, the segment is the same as the segment for the target cell. The manufacturer would vary across all manufacturers.

Related variables may also be derived. If the segment of interest is segment 1, then sales units of the other segments are the related variables. The unit of measurement data is again obtained by accessing the target cell and then accessing the three-dimensional structure 420 associated with the target cell.

E. Missing Values (Step 360)

While populating the data structures 410, 420, there may be some missing values. This problem may be handled by initializing the data structures 410 and 420 to zero. The possibility of divide by zero errors largely may occur in the events domain and unit of measurement domain. These can be dealt with by checking whether the variables 'stock' and 'totu' are greater than zero. For price variables, the values of 'nopu', 'fndu', 'dnfu', 'fadu' and 'tpru' are checked for a greater than zero condition. If these variables are zero, they represent zero participation events and for that case average price is used as a price measure. The model also ignores records for which sales are zero.

F. Output (Step 370)

This section presents the arrangement of output so that it can be fed into the neural network 500 of FIG. 5. In the preferred embodiment, the neural network 500 consists of six classes of variables used to predict two variables. The variables predicted are volume sales for the segment and category.

In the preferred embodiment, the output of the optimization component is therefore the input to the neural network 500 and consists of the following variables: Price and promotional pricing 540, percent ACV in distribution and promotion 550, baseline 560, competing segments 570, related segments 580, previous month of sales and promotions 590.

An example of specific data to be input into the neural network may include:

Five values of sales units from the competitor variables.

Six values of sales units from related variables.

Five values describing the type of promotion events along with five values of prices.

A baseline value representing the weekly and seasonal trends.

Four columns of historical data describing previous promotions and previous sales.

Sales units.

Category of total sales units.

Thus, there may be a total of twenty-eight columns of input to the neural network 500 with the 29th column holding values of the sales units and the 30th column holding values of category total sales units.

The data may be formatted with delimiters specific to the neural network 500. For example, if the input is to the neural network NeuralWare available from NEURALWARE, the data is arranged by joining the variables listed using commas as a delimiter.

3. The Evaluation Component

The evaluation component may consist of a neural network 500, again as shown in FIG. 5. There is one network for each account, region and segment combination for which promotion optimization will be necessary. The output of the optimization component is sent to the evaluation component and hence the network 500 is automatically updated by the optimization component.

As shown in FIG. 5, a neural network 500 consists of nodes 510 which process information (the ovals), and connections 520 which transmit the information to other nodes (the lines). The network learns by tuning the connections between the nodes.

The architecture of the evaluation component neural network 500 is as shown in FIG. 5.

The neural network may consider the following variables for each account-segment combination. These variables are received either through the estimation component 150 or the optimization component 140.

Everyday price 540

Promotional pricing for features, displays, features and displays or temporary price reductions 540.

Percent ACV in distribution for the segment being promoted 550.

Equivalent ACV of UPC's participating in a promotional event 550.

Percent ACV of stores participating in features, displays, features and displays or temporary price reductions 550.

A baseline composed of a trend and a seasonally component 560.

A trend may be expressed: "this segment grows by 5% yearly in this account." The seasonally component may be expressed by statements of the form "baseline sales vary 10% during the year, peaking in the summertime." The seasonally component will encompass all systematic sales variation of a seasonal form not otherwise explained by consumption cycles, promotions, competition, or the sales of related segments.

The sale (in volume) of competing segments 570. The model may be altered to accept as input planned promotional activity of competitors; or, this component can be maintained for evaluation purposes but removed for forecasting purposes.

The sales (in volume) of related segments 580.

The previous week and the four previous weeks of promotional activity and sales activity 590.

The neural network 500 uses these inputs to predict two output quantities 530. The first is the predicted volume 531 of the segment given a particular set of promotional events, the baseline, and the competitor activity. The second output is a prediction of the total retailer volume 532 of all segments in that category. Volume is predicted, while other units such as sales and profitability are computed from this prediction.

The evaluation system is modular. Networks 500 may be combined as needed. The network 500 estimates the best solution to the prediction and evaluation problem with input from the estimation component 150 and the optimization component 140.

Examples of neural networks include NEURALWARE available from NeuralWare, BACK PROPAGATION NEURAL NETWORK available from NCR and the neural network available in the KNOWLEDGE DISCOVERY DATABASE products available from NCR.

Although the present invention has been described with particular reference to certain preferred embodiments thereof, variations and modifications of the present invention can be effected within the spirit and scope of the following claims.

What is claimed is:

1. A system for optimizing the promotional sale of a product, wherein each product has an associated sales history, comprising:
   (a) means for generating a three-dimensional data structure corresponding to the sales history for a product, the data structure dimensions corresponding to an event type domain, a time domain, and a unit of measurement domain;
   (b) means for populating the three-dimensional data structure, wherein each element of the three-dimensional data structure is the sales history of the product for the corresponding event type, time and unit measurement;
   (c) a neural network;
   (d) means for training the neural network with the three-dimensional data structure; and
   (e) means for applying sales objectives and constraints to the neural network. thereby generating a promotional plan for the product.

2. A system for optimizing the promotional sale of a product segment, wherein each product segment is a group of products to be promoted together, each product having an associated sales history, the system comprising:
   (a) means for generating a three-dimensional data structure corresponding to the sales history for a product segment, the data structure dimensions corresponding to an event type domain, a time domain, and a unit of measurement domain;
   (b) means for populating the three-dimensional data structure, wherein each element of the three-dimensional data structure is an aggregate of the sales history of the products within the product segment for the corresponding event type, time and unit measurement;
   (c) a neural network;
   (d) means for training the neural network with the three-dimensional data structure; and
   (e) means for applying sales objectives and constraints to the neural network, thereby generating a promotional plan for the product segment.

3. A system for optimizing the promotional sale of a manufacturer's product segment taking into account sales of competing manufacturer's products in the same product segment, wherein each product segment is a group of products to be promoted together, and each product has an associated sales history and manufacturer, the system comprising:
   (a) means for generating a plurality of three-dimensional data structures, each three-dimensional data structure corresponding to the sales history for a product segment for a particular manufacturer, each data structure dimensions corresponding to an event type domain, a time domain, and a unit of measurement domain;
   (b) means for populating the three-dimensional data structure, wherein each element of each three-dimensional data structure is an aggregate of the sales history of the products within the product segment for the corresponding event type, time and unit measurement for the corresponding manufacturer;
   (c) a neural network;
   (d) means for training the neural network with the plurality of the three-dimensional data structures; and
   (e) means for applying sales objectives and constraints to the neural network for a selected manufacturer, thereby generating a promotional plan for the segment taking into consideration the sales of products by competing manufacturers.

4. A system for optimizing the promotional sale of a product segment for a particular manufacturer taking into account sales of competing manufacturer's products in the same segment and of related products by the particular manufacturer, wherein each segment is a group of products to be promoted together, and each product has an associated sales history and manufacturer, the system comprising:
   (a) means for generating a two-dimensional data structure, the data structure dimensions corresponding to manufacturer domain and a segment domain of a product;
   (b) means for populating the three-dimensional data structure linked to the two-dimensional data structure, the three-dimensional data structure corresponding to the sales history for a product segment for a manufacturer, the data structure dimensions corresponding to an event type domain, a time domain, and a unit of measurement domain;
   (c) means for populating the three-dimensional data structure, wherein each element of the three-dimensional data structure is an aggregate of the sales history of the products within the product segment for a manufacturer for the corresponding event type, time and unit of measurement;
   (d) a neural network;
   (e) means for training the neural network with the three-dimensional data structure; and
   (f) means for applying sales objectives and constraints to the neural network, thereby generating a promotional plan for the segment taking into consideration the sales of products in the same segment by competing manufacturers and the sale of related products by the particular manufacturer.

5. The system of claim 4 further including a means for applying sales objectives and constraints for a plurality of segments to the neural network thereby generating a promotional plan for a category, wherein a category is a group of segments, and each category has an associated sales history.

6. The system of claim 4 wherein the applying means includes the use of cost and profit formulas.

7. A process for automatically optimizing the promotional sale of a product utilizing a computer system, wherein each product has an associated sales history, comprising the steps of:
   (a) generating a three-dimensional data structure corresponding to the sales history for a product, the data structure dimensions corresponding to an event type domain, a time domain, and a unit of measurement domain;
   (b) populating the three-dimensional data structure, wherein each element of the three-dimensional data structure is an aggregate of the sales history of the products within the product segment for the corresponding event tape, time and unit measurement;
   (c) training a neural network with the three-dimensional data structure; and
   (d) applying sales objectives and constraints to the neural network, thereby generating a promotional plan for the product segment.

8. A process for automatically optimizing the promotional sale of a product segment utilizing a computer system, wherein each product segment is a group of products to be promoted together, each product having an associated sales history, the process comprising the steps of:

(a) generating a three-dimensional data structure corresponding to the sales history for a product segment, the data structure dimensions corresponding to an event type domain, a time domain, and a unit of measurement domain;

(b) populating the three-dimensional data structure, wherein each element of the three-dimensional data structure is an aggregate of the sales history of the products within the product segment for the corresponding event type, time and unit measurement;

(c) training the neural network with the three-dimensional data structure; and (d) applying sales objectives and constraints to the neural network, thereby generating a promotional plan for the product segment.

9. A process for automatically optimizing the promotional sale of a manufacturer's product segment taking into account sales of competing manufacturer's products in the same product segment, wherein each product segment is a group of products to be promoted together, and each product has an associated sales history and manufacturer, the process comprising the steps of:

(a) generating a plurality of three-dimensional data structures, each three-dimensional data structure corresponding to the sales history for a product segment for a particular manufacturer, each data structure dimensions corresponding to an event type domain, a time domain, and a unit of measurement domain;

(b) populating the three-dimensional data structure, wherein each element of each three-dimensional data structure is an aggregate of the sales history of the products within the product segment for the corresponding event type, time and unit measurement for the corresponding manufacturer;

(c) training the neural network with the plurality of the three-dimensional data structures; and (d) applying sales objectives and constraints to the neural network for a selected manufacturer, thereby generating a promotional plan for the segment taking into consideration the sales of products by competing manufacturers.

10. A process for automatically optimizing the promotional sale of a product segment for a particular manufacturer taking into account sales of competing manufacturer's products in the same segment and of related products by the particular manufacturer, wherein each segment is a group of products to be promoted together, and each product has an associated sales history and manufacturer, the process comprising the steps of:

(a) generating a two-dimensional data structure, the data structure dimensions corresponding to a manufacturer domain and a segment of a product;

(b) generating a three-dimensional data structure linked to the two-dimensional data structure, the three-dimensional data structure corresponding to the sales history for a product segment for a manufacturer, the data structure dimensions corresponding to an event type domain, a time domain, and a unit of measurement domain;

(c) populating the three-dimensional data structure, wherein each element of the three-dimensional data structure is an aggregate of the sales history of the products within the product segment for a manufacturer for the corresponding event type, time and unit of measurement;

(d) training the neural network with the three-dimensional data structure; and (e) applying sales objectives and constraints to the neural network, thereby generating a promotional plan for the segment taking into consideration the sales of products in the same segment by competing manufacturers and the sale of related products by the particular manufacturer.

11. The process of claim 10 further including the step of applying sales objectives and constraints for a plurality of segments to the neural network thereby generating a promotional plan for a category, wherein a category is a group of segments, and each category has an associated sales history.

12. The process of claim 10 wherein the applying step includes the use of cost and profit formulas.

* * * * *

UNITED STATES PATENT AND TRADEMARK OFFICE
CERTIFICATE OF CORRECTION

PATENT NO. : 6,029,139
DATED : February 22, 2000
INVENTOR(S) : Scott Cunningham et al.

It is certified that error appears in the above-indentified patent and that said Letters Patent is hereby corrected as shown below:

Column 14, line 58, delete "tape" and substitute --type--.

Signed and Sealed this

Seventeenth Day of April, 2001

Attest:

NICHOLAS P. GODICI

Attesting Officer     Acting Director of the United States Patent and Trademark Office